US009476439B1

(12) United States Patent
Liao

(10) Patent No.: US 9,476,439 B1
(45) Date of Patent: Oct. 25, 2016

(54) CLAMPING DEVICE FOR CLAMPING PORTABLE SMART APPARATUS

(71) Applicant: Tsun-Chi Liao, Taichung (TW)

(72) Inventor: Tsun-Chi Liao, Taichung (TW)

( * ) Notice: Subject to any disclaimer, the term of this patent is extended or adjusted under 35 U.S.C. 154(b) by 0 days.

(21) Appl. No.: 14/749,011

(22) Filed: Jun. 24, 2015

(51) Int. Cl.
| *F16M 13/00* | (2006.01) |
| *F16B 2/12* | (2006.01) |
| *F16M 13/02* | (2006.01) |
| *F16C 11/06* | (2006.01) |
| *H05K 5/02* | (2006.01) |

(52) U.S. Cl.
CPC ............. *F16B 2/12* (2013.01); *F16C 11/06* (2013.01); *F16M 13/022* (2013.01); *H05K 5/0204* (2013.01)

(58) Field of Classification Search
USPC ............ 248/316.1, 316.4, 316.6, 121, 124.2
See application file for complete search history.

(56) References Cited

U.S. PATENT DOCUMENTS

| 8,864,089 | B2 * | 10/2014 | Hung | F16M 11/041 248/122.1 |
| 8,998,048 | B1 * | 4/2015 | Wu | B62J 11/00 224/420 |
| 9,103,492 | B2 * | 8/2015 | Springer | F16M 11/041 |
| 9,285,832 | B2 * | 3/2016 | Galant | F16M 11/105 |
| 9,297,495 | B2 * | 3/2016 | Fischer | F16M 11/14 |
| 2012/0234055 | A1 * | 9/2012 | Bland, III | E05B 73/0082 70/15 |
| 2013/0026324 | A1 * | 1/2013 | Fischer | F16M 11/041 248/316.1 |

* cited by examiner

*Primary Examiner* — Steven Marsh
(74) *Attorney, Agent, or Firm* — Muncy, Geissler, Olds & Lowe, P.C.

(57) ABSTRACT

A clamping device for clamping a portable smart apparatus includes an installation plate, two clamping elements and an elastic member. Two ends of the elastic members are respectively connected to the two clamping elements. The two clamping elements are opposite each other and are slidably disposed on the installation plate. Each of the two clamping elements is disposed with a rotating ring, which has its two ends pivotally connected to two ends of the clamping element and forming a clamping rod on the clamping element. The two clamping elements respectively clamp two diagonal corners of the portable smart apparatus. By rotating the rotating ring, a gap between the clamping rod and the clamping element can be changed. The two clamping elements are further capable of relative sliding movements. Accordingly, the present invention is apt for clamping portable smart apparatuses having different thicknesses and sizes to satisfy utilization requirements.

10 Claims, 6 Drawing Sheets

CLAMPING DEVICE FOR CLAMPING PORTABLE SMART APPARATUS

FIELD OF THE INVENTION

The present invention relates to a clamping device, and particularly to a clamping device for clamping portable smart apparatus.

BACKGROUND OF THE INVENTION

Portable smart apparatuses, such as smart cell phones and tablet computers, are nowadays indispensable electronic devices in people's daily lives. Portable smart apparatuses are capable of providing information that people need at all times, and are thus popular among the society. Further, portable smart apparatuses provide information in paperless means, hence reducing the use of paper. In the current world with rising environmental awareness, portable smart apparatuses are extensively applied in all sorts of occasions.

To use a portable smart apparatus in these occasions, the very first step is to clamp the portable smart apparatus. For example, in a venue for playing musical instruments, the portable smart apparatus may serve as an electronic score. Referring to FIG. 1, to secure a portable smart apparatus, a conventional approach utilizes a clamping element 1 for securing the portable smart apparatus. The conventional clamping element 1 includes two clamping blocks 2 capable of relative sliding movements, and an elastic member 3 having two ends respectively connected to the two clamping blocks 2. The clamping blocks 2 are L-shaped blocks, and form a clamping groove 4 for accommodating corners of the portable smart apparatus. Thus, with the elastic force of the elastic member 3, the two clamping blocks 2 respectively clamp two diagonal corners of the portable smart apparatus, so as to secure the portable smart apparatus.

In the above conventional clamping approach, the width of the clamping groove 4 is invariable, and may become inapplicable when the thickness of the portable smart apparatus is greater than the width of the clamping groove 4. Further, when the thickness of the portable smart apparatus is far smaller than the width of the clamping groove 4, the clamping groove 4 loses the effect of clamping the sides, and the portable smart apparatus can only rely on the elastic force of the elastic member 3 to press against and secure the portable smart apparatus at the two sides. When a large vibration is received, the elastic member 3 may become loose. That is, the clamping groove 4 is incapable of reliably securing the portable smart apparatus, which then may be exposed to risks of disengagement and falling off.

SUMMARY OF THE INVENTION

Therefore, the primary object of the present invention is to disclose a clamping device for clamping portable smart apparatuses having different thicknesses.

To achieve the above object, the present invention provides a clamping device. The clamping device, for clamping a portable smart apparatus, includes an installation plate, two clamping elements and an elastic member. The two clamping elements are opposite and are slidably disposed on the installation plate. A rotating ring is disposed on each of the two clamping elements, and has its two ends respectively pivotally connected to two sides of the clamping element and forming a clamping rod on the clamping element. The two clamping rods clamp two diagonal corners of the portable smart apparatus, and two ends of the elastic member are respectively connected to the two clamping elements.

Accordingly, by rotating the rotating ring in the present invention, a gap between the clamping rod and the clamping element can be changed, such that the present invention is apt for clamping portable smart apparatuses having different thicknesses. Therefore, portable smart apparatuses having different thicknesses and sizes can be clamped using the present invention to satisfy utilization requirements.

DETAILED DESCRIPTION OF THE PREFERRED EMBODIMENTS

The foregoing, as well as additional objects, features and advantages of the invention will be more readily apparent from the following detailed description, which proceeds with reference to the accompanying drawings.

Figure 1:
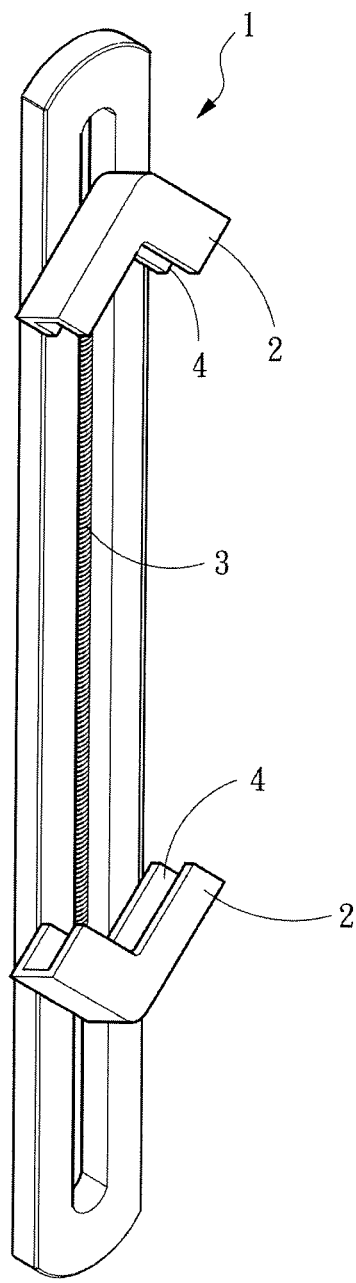
FIG. 1 is a diagram of a conventional clamping structure for a portable smart apparatus.
Figure 2:
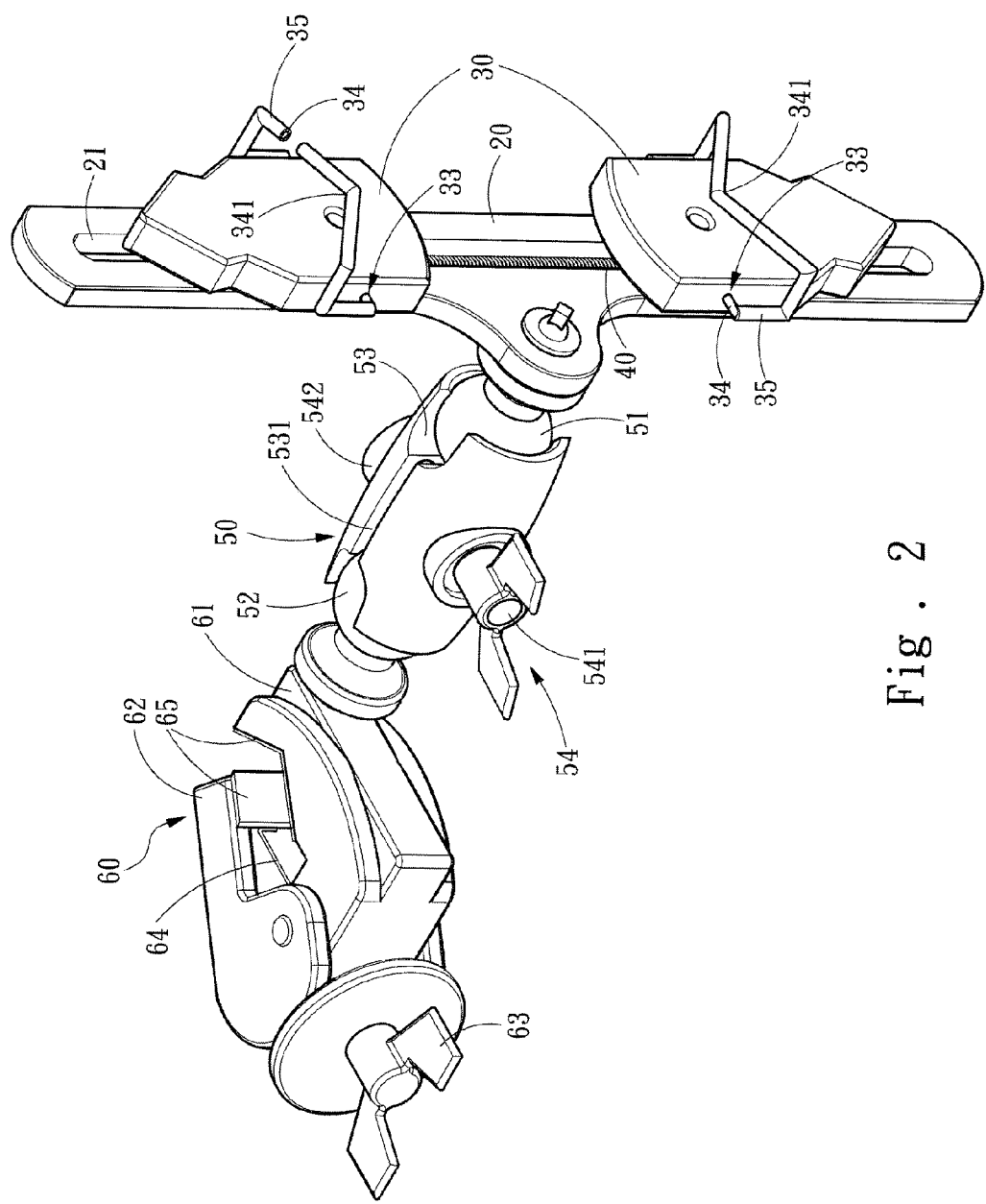
FIG. 2 is a structural diagram of an assembly of the present invention.
Figure 3:
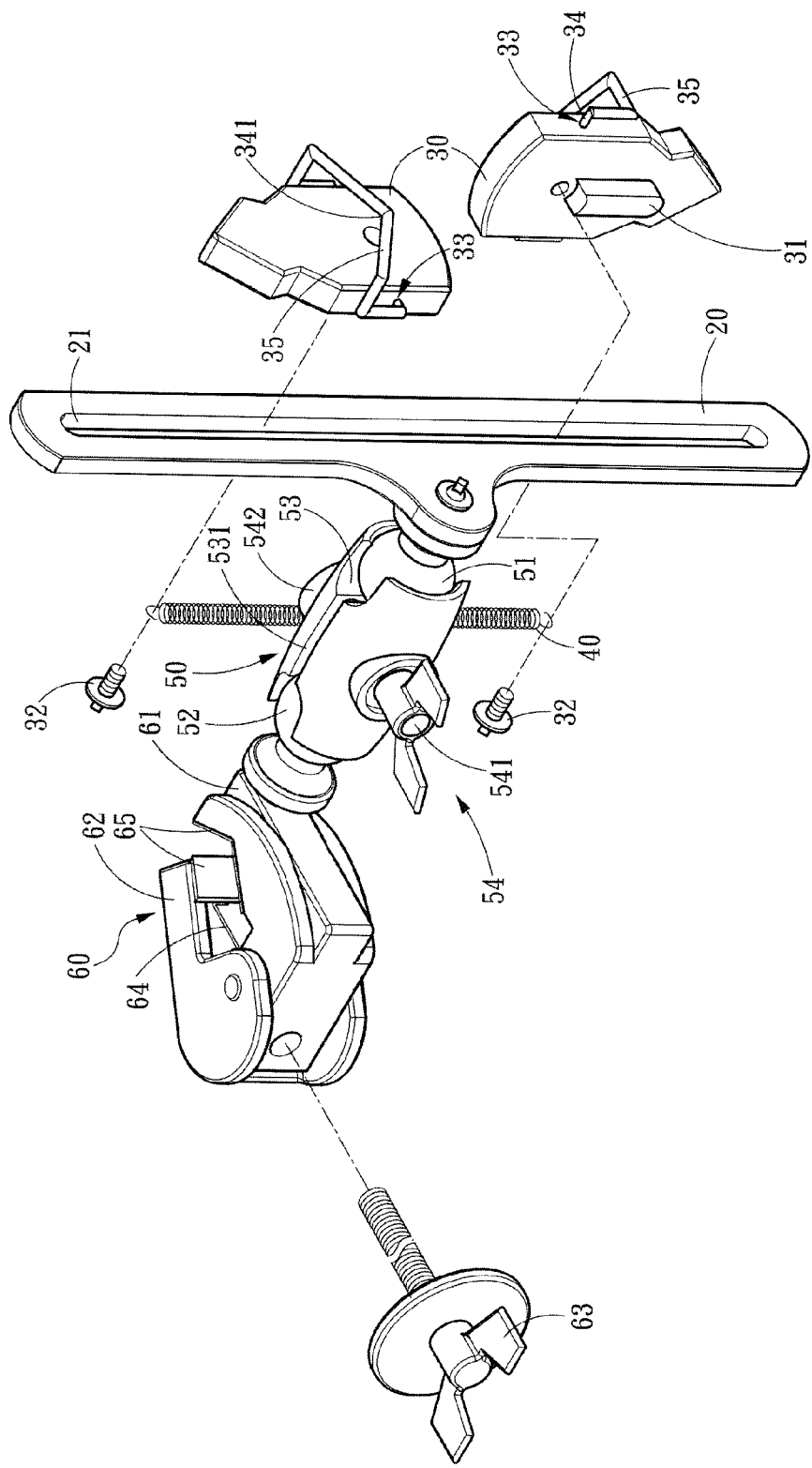
FIG. 3 is an exploded view of the present invention.
Figure 4:
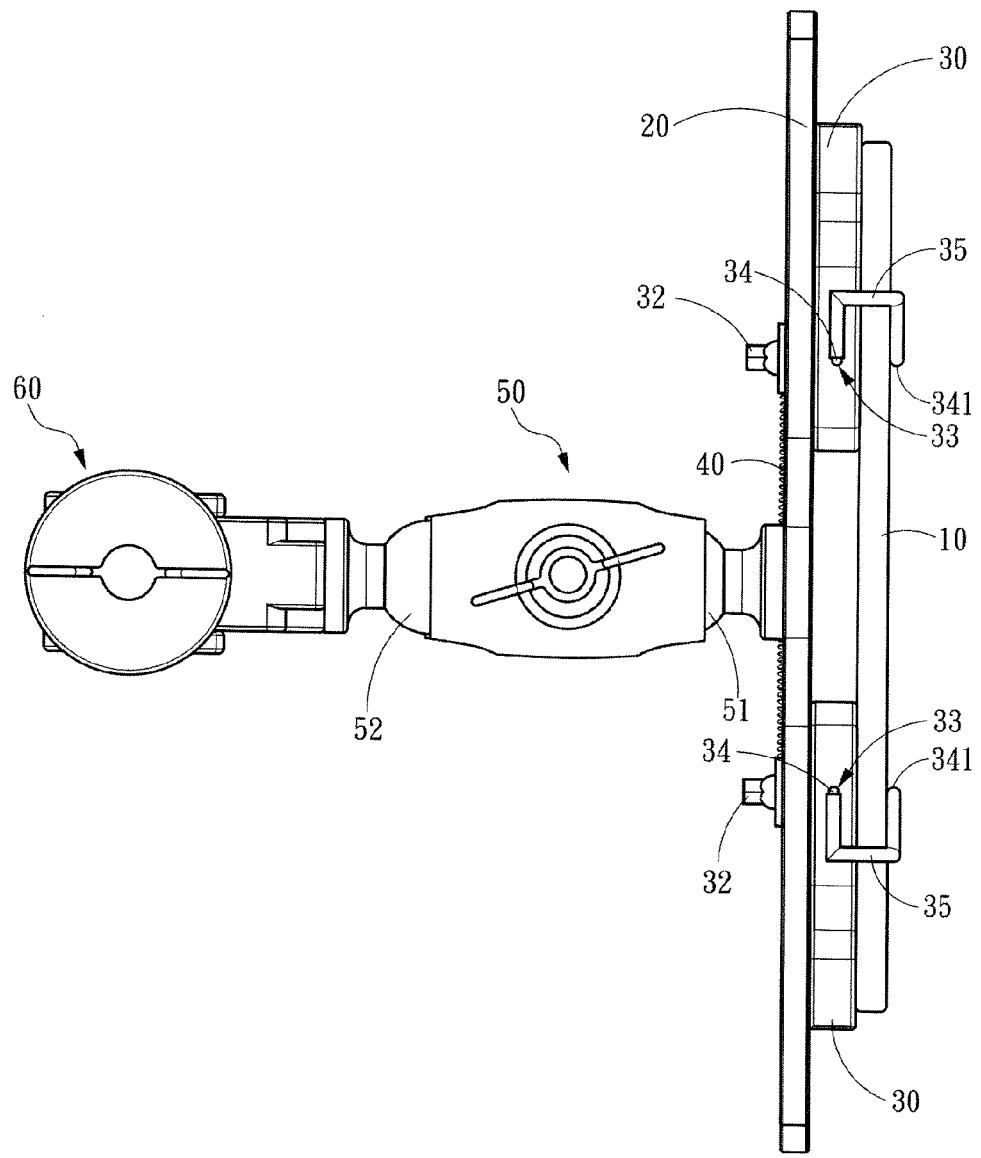
FIG. 4 is a structural diagram of the present invention clamping a portable smart apparatus.

Referring to FIG. 2, FIG. 3 and FIG. 4, the present invention provides a clamping device. The clamping device, for clamping a portable smart apparatus 10, includes an installation plate 20, a two clamping elements 30 and an elastic member 40. The two clamping elements 30 are opposite, and are slidably disposed on the installation plate 20. In practice, the installation plate 20 may include a sliding groove 21, and each of the two clamping elements 30 includes a protrusion block 31 corresponding to the sliding groove 21. The two protrusion blocks 31 are slidably disposed on the sliding groove 21. Further, each of the two clamping elements 30 includes a securing element 32 fastened on the sliding groove 21, so as to fix the two clamping elements 30 on the sliding groove 21 through the securing elements 32.

Each of the two clamping elements 30 further includes a rotating ring 33, which has its two ends pivotally connected to two sides of the clamping element 30 and forming a clamping rod 34 on the clamping element 30. The two clamping rods 34 respectively clamp two diagonal corners of the portable smart apparatus 10. The clamping rods 34 may include respective bending portions 341 located close to each other. The design of the bending portions 341 allows the two clamping rods 34 to extend inward, which increases the stability for securing the portable smart apparatus 10 having a small size. To prevent the portable smart apparatus 10 from scratching, each of the clamping rods 34 may be clad by a soft cover 35. Two ends of the elastic member 40 are respectively connected to the two clamping elements 30. Thus, when the two clamping elements 30 are located away from each other and jointly clamp the portable smart apparatus 10, the elastic member 40 may provide the two clamping elements 30 with an elastic force for steadily clamping the portable smart apparatus 10.

Figure 5:
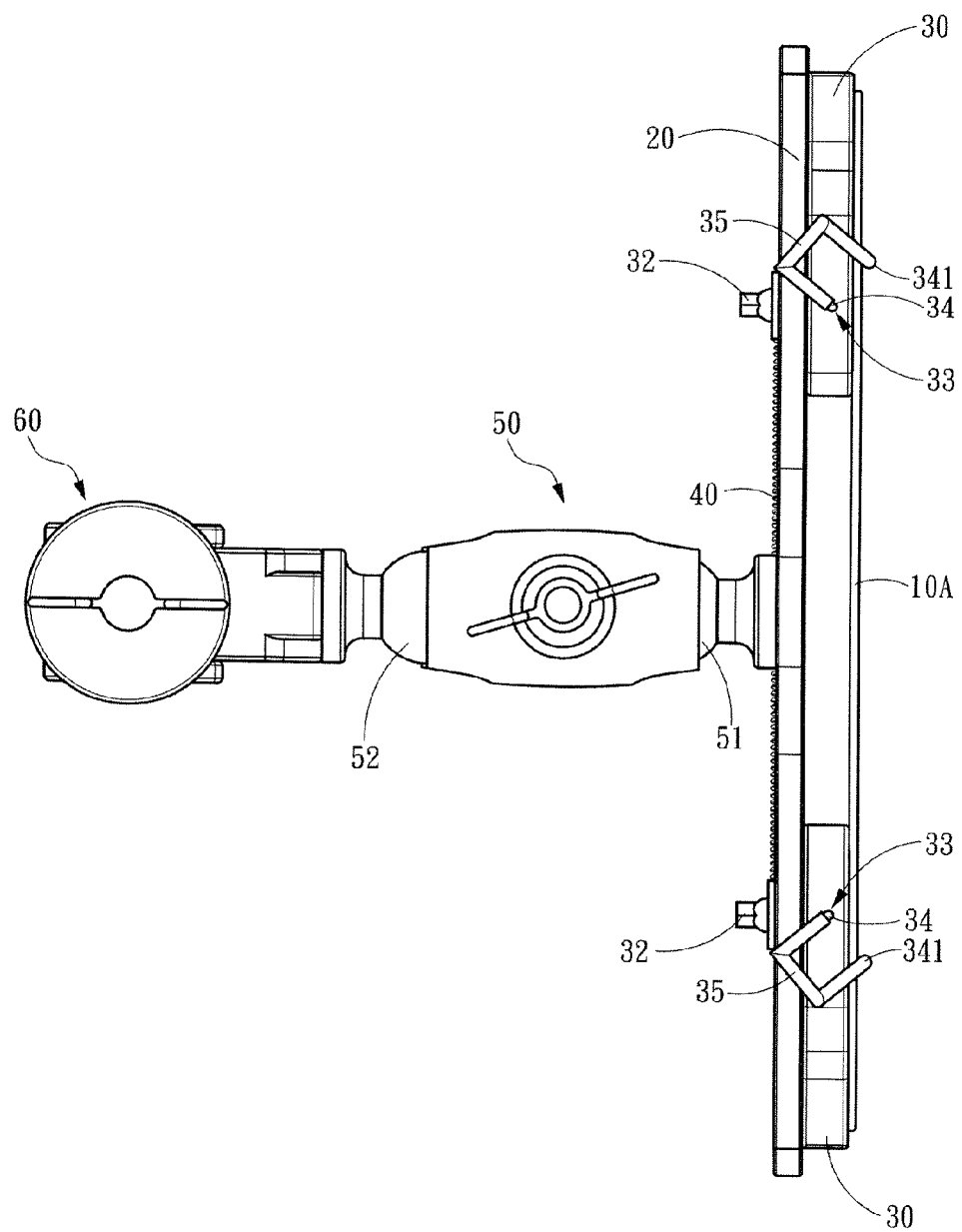
FIG. 5 is a structural diagram of the present invention clamping another portable smart apparatus.

Referring to FIG. 5, in the present invention, the gap between the clamping rod 34 and the clamping element 30 can be changed by rotating the rotating ring 33, so that the present invention is apt for a portable smart apparatus 10A having a different thickness. Further, the two clamping elements 30 are capable of relative sliding movements, so that the present invention is apt for clamping the portable smart apparatus 10 having different sizes.

The present invention may further include a connecting shaft 50 and a clamping portion 60. Two ends of the connecting shaft 50 respectively include a first universal joint 51 and a second universal joint 52. The installation plate 20 is pivotally connected to the first universal joint 51, and the clamping portion 60 is pivotally connected to the second universal joint 52.

Figure 6:
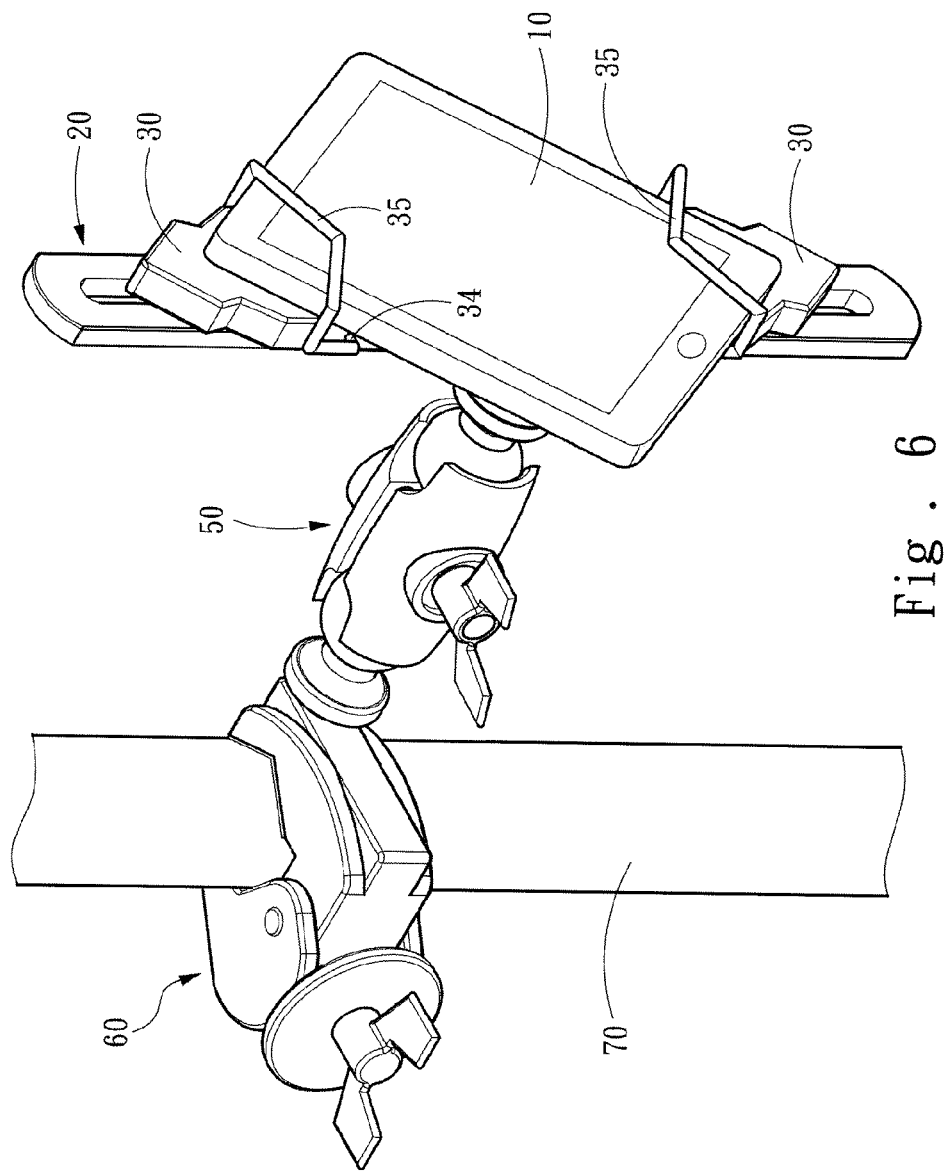
FIG. 6 is a schematic diagram of the present invention in implementation.

Referring to FIG. 6, the present invention may be clamped to a pole 70 or a desktop (not shown) through the clamping portion 60, and a placement position of the installation plate 20 can be easily adjusted through the first universal joint 51 and the second universal joint 52. That is, the placement angle of the portable smart apparatus 10 can be adjusted to satisfy utilization requirements.

Further, the connecting shaft 50 may include an accommodating space 53, which has an open channel 531. Two sides of the open channel 431 are penetrated by a screw element 54. The screw element 54 has a screw nut 541, and a rotating screw member 542 that is rotated and screwed into the screw nut 541 and presses tightly against the open channel 531 to change accommodating space 53. The first universal joint 51 and the second universal joint 52 are respectively disposed at two sides of the accommodating space 53. Thus, by rotating the rotating screw member 542, the space of the accommodating space 53 can be changed, i.e., changing the tightness of the accommodating space 53 clamping the first universal joint 51 and the second universal joint 52. Further, by loosening the rotating screw member 542, the first universal joint 51 and the second universal joint 52 can be rotated. When a desired angle is reached, the rotating screw member 542 is screw tightened, and the first universal joint 51 and the second universal joint 52 can then be secured.

Further, the clamping portion 60 includes a fixed portion 61 pivotally connected to the second universal joint 52, a rotating portion 62 that opens and closes relative to the fixed portion 61, and a fastening member 63 that penetrates through and packs against the fixed portion 61 and the rotating portion 62. Through the relative displacement of the rotating portion 62 and the fixed portion 61 as well as the packing of the fastening member 63, the rotating portion 62 and the fixed portion 61 are allowed to tightly clamp to the pole 70 or onto the desktop. For enhanced ease of use, between the rotating portion 62 and the fixed portion 61, a restoring element 64 that constantly stretches open the rotating portion 62 and the fixed portion 61 may be provided. At each of the corresponding positions of the fixed portion 61 and the rotating portion 62, a protection soft pad 65 may be disposed to reinforce the clamping stability.

As described, the present invention is apt for portable smart apparatuses having different thicknesses mainly through the rotatable design of the rotating ring. That is, the gap between the clamping rod and the clamping element can be changed by rotating the rotating ring. Further, the two clamping elements are capable of relative sliding movements, and are thus suitable for clamping portable smart devices having different sizes. In other words, the present invention is apt for clamping portable smart apparatuses having different sizes to satisfy utilization requirements.

What is claimed is:

1. A clamping device for clamping a portable smart apparatus, comprising:
   an installation plate;
   two clamping elements, being opposite each other and slidably disposed on the installation plate, each of the two clamping elements disposed with a rotating ring, two ends of the rotating ring pivotally connected to two sides of the clamping element and forming a clamping rod on the clamping element, the two clamping elements respectively clamping two diagonal corners of the portable smart apparatus; and
   an elastic member, including two ends respectively connected to the two clamping elements.

2. The clamping device of claim 1, wherein the installation plate comprises a sliding groove, each of the two clamping elements comprises a protrusion block corresponding to the sliding groove, the two protrusion blocks are slidably disposed on the sliding groove, and each of the two clamping elements comprises a securing element fastened at the sliding groove.

3. The clamping device of claim 1, wherein the two clamping rods comprise respective bending portions located close to each other.

4. The clamping device of claim 1, wherein each of the two clamping rods is clad by a soft cover.

5. The clamping device of claim 1, further comprising a connecting shaft, two ends of the connecting shaft respectively comprising a first universal joint and a second universal joint, the installation plate being pivotally connected to the first universal joint.

6. The clamping device of claim 5, wherein the connecting shaft includes an accommodating space, the accommodating space includes an open channel, two sides of the open channel are penetrated by a screw element, the screw element includes a screw nut, and a rotating screw member that is rotated and screwed into the screw nut and presses tightly against the open channel to change the accommodating space, and the first universal joint and the second universal joint are respectively disposed at two sides of the accommodating space.

7. The clamping device of claim 5, further comprising a clamping portion pivotally connected to the second universal joint.

8. The clamping device of claim 7, wherein the clamping portion comprises a fixed portion pivotally connected to the second universal joint, a rotating portion that opens and closes relative to the fixed portion, and a fastening member that penetrates through and packs against the fixed portion and the rotating portion.

9. The clamping device of claim 8, wherein between the rotating portion and the fixed portion is a restoring element that constantly stretches open the rotating portion and the fixed portion.

10. The clamping device of claim 8, wherein a protection soft pad is disposed at each of corresponding positions of the fixed portion and the rotating portion.

* * * * *